(12) United States Patent
Keyes

(10) Patent No.: US 7,143,788 B2
(45) Date of Patent: Dec. 5, 2006

(54) HIGH TEMPERATURE LINE EXPANSION INSTALLATION WITH BELLOWS

(75) Inventor: Thomas Joseph Keyes, Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 250 days.

(21) Appl. No.: 10/945,174

(22) Filed: Sep. 20, 2004

(65) Prior Publication Data

US 2006/0061092 A1    Mar. 23, 2006

(51) Int. Cl.
*F16L 11/00*    (2006.01)

(52) U.S. Cl. ............... 138/120; 138/149; 138/118; 285/45; 285/226; 285/228

(58) Field of Classification Search ............... 138/118, 138/149, 120, 155; 285/226, 228, 45
See application file for complete search history.

(56) References Cited

U.S. PATENT DOCUMENTS

| | | | |
|---|---|---|---|
| 3,330,303 A * | 7/1967 | Fochler | 138/120 |
| 3,359,016 A | 12/1967 | Sarlls | 285/228 |
| 3,369,829 A * | 2/1968 | Hopkins | 285/227 |
| 3,837,685 A | 9/1974 | Miller | 285/45 |
| 3,901,539 A * | 8/1975 | Ijzerman | 285/41 |
| 3,997,194 A * | 12/1976 | Eifer et al. | 285/53 |
| 4,023,782 A * | 5/1977 | Eifer | 266/186 |
| 4,060,263 A * | 11/1977 | Kotcharian | 285/47 |
| 4,162,093 A * | 7/1979 | Sigmund | 285/47 |
| 4,239,267 A | 12/1980 | Hudson | 285/228 |
| 4,350,372 A | 9/1982 | Logsdon | 285/45 |
| 4,484,386 A | 11/1984 | Stonitsch | 29/455 |
| 4,685,703 A * | 8/1987 | Brock | 285/47 |
| 5,058,934 A | 10/1991 | Brannon | 285/226 |
| 5,340,165 A * | 8/1994 | Sheppard | 285/226 |
| 6,216,745 B1 * | 4/2001 | Augustynowicz et al. | 138/149 |
| 2003/0094208 A1 * | 5/2003 | Gabriel et al. | 138/120 |

* cited by examiner

*Primary Examiner*—Patrick Brinson
(74) *Attorney, Agent, or Firm*—Charles D. Gunter, Jr.

(57) ABSTRACT

An flexible coupling is shown for an insulated piping system of the type used to convey steam and other high temperature fluids. The coupling uses a flexible bellows and additional insulating and joining components to couple conventional lengths of insulated pipe. The bellows arrangement compensates for any relative movement of the inner fluid conveying pipes with respect to the outer layers of insulating material and outer jacket in order to protect the integrity of the assembly and prevent the intrusion of water or other contaminants which could lead to corrosion or early failure of the piping system.

17 Claims, 3 Drawing Sheets

HIGH TEMPERATURE LINE EXPANSION INSTALLATION WITH BELLOWS

BACKGROUND OF THE INVENTION

1. Field of the Invention

The present invention relates to foam bonded pre-insulated piping systems, and more specifically to an expansion installation which compensates for the disbandment of the foam from the carrier pipe as these systems thermally expand in the presence of high temperature fluids being conveyed.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Insulated pipe is conventional and commercially available. There are predominately two types of piping systems in use: Class-A drainable dryable testable (DDT); and polyurethane or polyisocyanurate bonded foam systems. The present application is directed toward the bonded foam type system. These systems utilize a steel pipe to convey fluid. Around the outside of the steel pipe is a layer of insulating foam such as, for example, polyisocyanurate foam. Around the outside of the foam is a jacket of hard thermoplastic (such as high density polyethylene, HDPE). The plastic jacket protects the foam from mechanical damage and also provides a water tight seal to prevent corrosion of the steel pipe. Although steel is commonly used for the inner pipe which carries the media to be piped, copper or aluminum or other metals as well as fiberglass, PVC, and similar materials may be utilized, as well.

The most important engineering criteria for a foam system of the type under consideration is that it must be treated as a bonded system. In other words, the foam is bonded to both the carrier pipe and the outer jacket. Therefore, the bonded system acts as a monolithic unit moving underground. Higher temperatures can act adversely upon the bonded foam system, however. The hot fluid in the steel carrier pipe causes the carrier pipe to thermally expand. At temperatures of 400° F. this expansion is on the order of 2.8 inches per 100 feet of pipe. This expansion is not a problem as long as the system remains bonded and the carrier pipe, foam and jacket move together as one unit underground. This movement is controlled by the expansion force of the steel carrier pipe, but it is the bond strength of the foam to the pipe and jacket that is important in keeping the system moving together. This monolithic movement of the system occurs along each incremental length of a particular run, and as long as total movement is not greater than 4 to 6 inches and the system remains bonded, no undue stress is subjected at any one point of the jacket. If the system however were to disbond, the surrounding soil would fix the jacket in place and the carrier pipe would still thermally expand thereby pushing thorough and destroying the jacket at the first change of direction.

Generally speaking, the proper choice of insulating materials can counteract may of the thermal expansion effects discussed above. It has been well established by industry case history that the polyurethane foam bond for systems running at 250° to 300° is strong enough to keep the entire system acting as a bonded system. However, for systems running above these temperatures a higher temperature rated foam, such as polyisocyanurate foam, is required. However, in systems utilizing "high temperature" polyiscyanurate foam, the higher heat can, in some instances, begin to fry the foam at the foam/carrier pipe interface, thereby bringing into question the strength of the foam bond to the steel carrier pipe.

Various approaches have been taken to control this undesirable expansion in insulated pipe systems of the type under consideration. For example, expansion "bolster" materials are supplied in the form of resilient pads which can be used to wrap the HDPE jacket at elbows or expansion loops.

Flexible couplings have also been disclosed in the prior art for purposes of connecting misaligned plumbing for liquids or gas, for shock absorption, and for providing flexibility when the connections to which the couplings are attached are not originally fixed with respect to each other. For example, in earthquake prone areas, it may be desirable to provide flexible couplings in plastic waterline systems. In the case of high temperature or high pressure systems, more complicated bellows-type systems have been employed. For example, U.S. Pat. No. 4,239,267 shows an expansion joint which features an internal bellows member within a special steel housing.

U.S. Pat. No. 3,488,949 shows a piping system which includes three separate bellows having two floating piping sections surrounded by a wrapper plate for use in piping systems subjected to both thermal and pressure stresses.

Despite these advances, a need exists for an expansion installation in a piping system for high temperature fluids such as insulated steam line which is less complex than the high temperature and pressure installations discussed above. A need also exists for such an installation system which utilizes many of the conventionally available materials and manufacturing techniques commonly used in the industry. A need also exists for such a flexible coupling installation which is simple in design and economical to implement.

SUMMARY OF THE INVENTION

The present invention has as its general object to provide a flexible coupling for a high temperature line expansion installation which satisfies the previously described deficiencies in the prior art systems.

Another object of the invention is to provide such a flexible coupling which includes a bellows arrangement in combination with other specific materials to provide a flexible coupling which eliminates the tendency of an elbow to pose expansion problems in the presence of high temperatures or pressures.

In the flexible, extendable and contractible pipe coupling of the invention, a first and second length of insulated and jacketed pipe are provided. Each length of pipe has a joining end to be joined to an end of the other length. In the preferred form of the invention, each pipe length comprises an inner pipe, an envelope of foamed insulation surrounding the inner pipe and an outer jacket surrounding the envelope of insulation. Each inner pipe projects beyond the end of the envelope of insulation and beyond an end of the jacket to form an exposed, joining end. The joining ends of the inner pipes are welded together to form a continuous fluid conduit for conveying high temperature fluids. A layer of high temperature insulation is installed which surrounds the joining ends of the inner pipes. A tubular bellows surrounds the joining ends of the inner pipes and the layer of previously applied high temperature insulation. The bellows is capable of being axially expanded and contracted and of being configured in a straight or curved axial configuration. The tubular bellows has opposing outer extents which are joined to the foamed insulation surrounding the respective pipe lengths being coupled.

Preferably, the foam used to surround the inner pipes and to surround the joining ends of the inner pipes within the bellows interior is selected from the group consisting of polyurethane foams and polyisocyanurate foams, depending upon the temperature range of the fluid being conveyed. The protective jacket is preferably formed of a temperature rated polyolefin, such as high density polyethylene.

Additional objects, features and advantages will be apparent in the written description which follows.

DETAILED DESCRIPTION OF THE INVENTION

Figure 1:
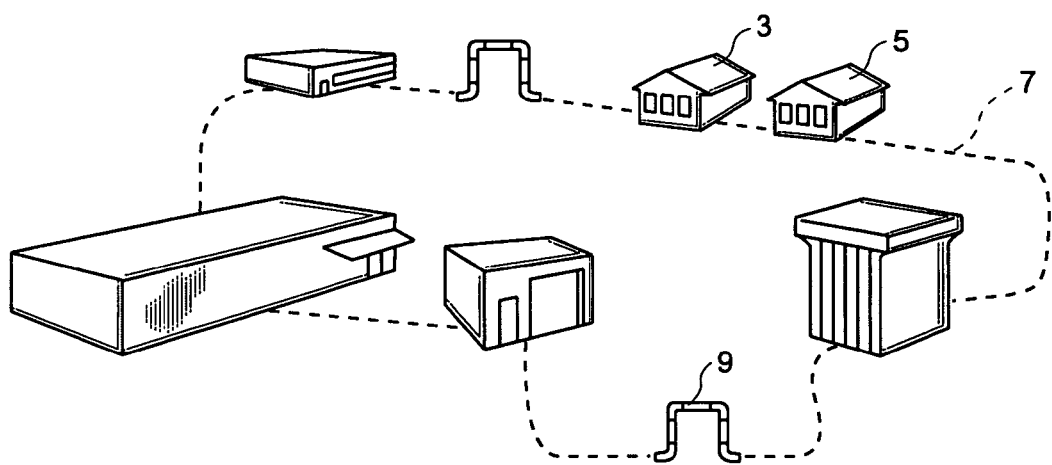
FIG. 1 is a simplified representation of a typical distributed HVAC system utilizing chilled water for cooling and steam for heating.
Figure 2:
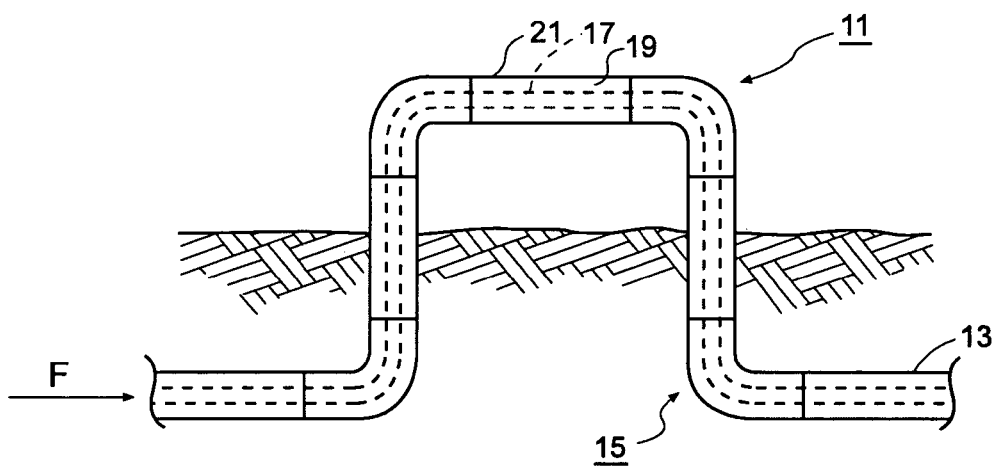
FIG. 2 is a schematic representation of an expansion loop in a pre-insulated pipeline prior to thermal expansion.
Figure 3:
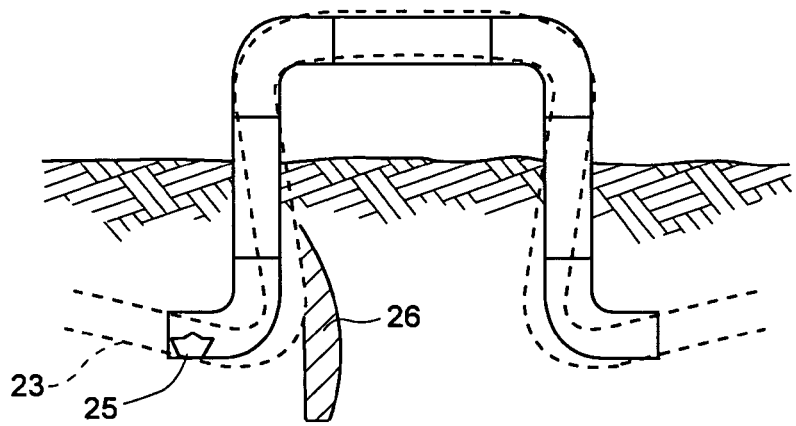
FIG. 3 is a schematic view of the pipeline of FIG. 2 under the influence of thermal expansion forces.

Turning first to FIGS. 1–3, there is illustrated a typical environment in which the pre-insulated piping systems of the invention might be employed. FIG. 1 shows a school campus having a number of isolated buildings 3, 5 connected by an underground insulated pipeline carrying steam which at points includes right angle loops or elbows 9.

FIGS. 2 and 3 are schematic views of the standard piping installation of the type under consideration designated generally as 11. The installation 11 includes a number of coaxially oriented lengths of pipe, such as length 13 (shown broken away in FIG. 2). The installation may also include a number of angled fittings such as the right angle elbows (generally shown as 15) in FIG. 2. Each length of pipe includes an inner pipe 17, typically formed of steel, an envelope of foamed insulation 19 surrounding the inner pipe and outer protective jacket 21 surrounding the envelope of insulation. The joining ends (shown generally as 35, 37 in FIG. 7) of adjacent pipe lengths are afixed, as by being welded together, to form fixed joints, whereby the adjacent pipe lengths provide a continuous fluid conduit for conveying high temperature fluids. The jacket 21 (FIG. 1) is typically formed of high density polyethylene (HDPE) or a similar polyolefin type material. The following references, among others, teach the manufacture of such prior art systems: U.S. Pat. Nos. 3,793,4111; 4,084,842; and 4,221,405, all to Stonitsch et al.

The piping systems of the type illustrated in FIGS. 2 and 3 are sometimes utilized to convey fluids at high temperature and/or pressures. For example, a typical steam line might be conveying fluid at, for example, 400° F. The temperature differentials which exists between the piping system materials and the fluid being conveyed can cause a force ("F" in FIG. 2) to be applied along the coaxially aligned pipes lengths. If the carrier is free to move independently from the foam and jacket (disbondment has occurred) then the surrounding soil will fix the jacket in place and the carrier pipe will burst through the foam and jacket in areas shown generally as 15 and 13 in FIG. 2.

In the piping system illustrated in FIG. 3, the system is displacing as a unit and moves into both a cushioned bolster padding 26 and the surrounding soil 28. This movement does not damage the jacketing or the foam of the system because they are both incrementally being pulled along throughout the entire length of the straight run. Because of this monolithic movement no one individual section of the jacket is over stressed and thereby ruptured, and no one individual section of the foam is required to support the entire force of the thermal expansion of the pipe. The bond distributes these forces along each incremental length of the entire run. It will be understood, however, that should the forces become great enough, disbondment of the foam from the carrier pipe can occur. In such case, the foam and outer jacket can be ruptured, as illustrated generally at 25 in FIG. 3. Failure of the surrounding insulated layers allows water or other contaminants to contact the steel pipe, leading to increased corrosion and joint failure in some cases.

The present invention is directed toward an expansion installation for high temperature insulated piping systems of the type illustrated generally in FIGS. 1–3. The present invention is intended to provide a solution for possible disbondment problems for foam bonded piping systems that are operating at temperatures in the range of 250° F. and above 250° F. At temperatures that begin to exceed 250° F., foams have been developed that are stable structurally to handle these higher temperature, but the bond strength of the foams at these temperatures may come into question. The invention is intended to prevent the potential problems that might occur if the foam bond strength is not sufficient to cause the system to expand as one monolithic item.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy conveying pipes, open or closed cell polyurethane, polyisocyanurate, polystyrene or the like, foamed rigid insulation and polypropylene, polybutylene, polyethylene, polyvinylchloride and similar protective jackets.

The term "high temperature", as used in this discussion, will be any temperature exceeding 250° F., which is the present temperature limitation at which polyurethane foam is used in bonded foam systems. Temperatures above 250° F. require the use of higher temperature foams, such as polyisocyanurate foam, whose bond strength may come into question.

The present invention is an improvement to presently available pre-insulated piping of the type which is commercially available and familiar to those in the relevant industries. Prior art pipe lengths of this general type are commercially available as standard factory type product. For example, such product is available from Thermacor Process, LP of Fort Worth, Tex., assignee of the present invention. One typical example is sold commercially as the HT-406 High Temp Steel Piping System. The published specifications for systems are as follows:

| Carrier Pipe- | |
|---|---|
| diameter less than about 2" | A53 ERW Grade B, Std. Wt. Black Steel |
| diameter greater than about 2" | A106 SML, Std. Wt. Black Steel |

| HDPE Jacket- Compatible with ASTM D3350 | |
|---|---|
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |
| Impact Strength (ASTM D256) | 2.0 ft. lb/in. North Min. |
| Rockwell Hardness (ASTM D785) | D60 (Shore) min. |

| Polyisocyanurate Insulation- | |
|---|---|
| Density | >2.4 lbs/ft$^3$ |
| "K" Factor | ≦0.14 @ 70° F., ≦0.24 @ 406° F. |
| Compressive Strength | >30 psi |
| Closed Cell Content | ≧90% |
| Minimum Thickness | ≧2.5" @ 366° F., ≧3.0" @ 406° F. |

The present invention is directed toward a flexible, extendible and contractible pipe coupling for use in high temperature insulated piping systems of the type illustrated generally in FIGS. 1–3. The flexible coupling is intended to alleviate the damaging forces applied to "fittings" of the type shown in FIGS. 2 and 3. While the term "fitting" will be generally directed toward 90° elbows, in this discussion, the term will be understood to include other angular fittings, such as, for example, 45° fittings, 60° fittings, etc.

Figure 7:
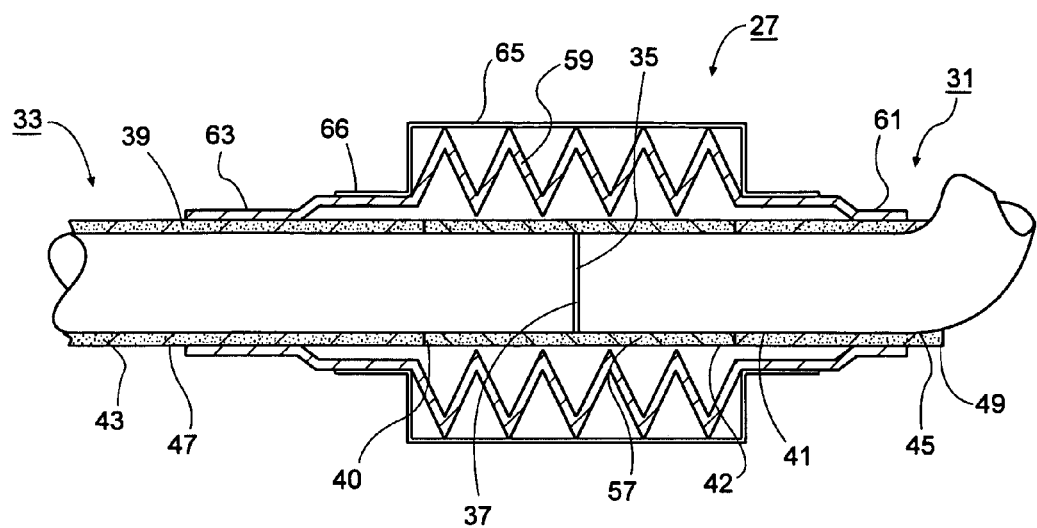
FIG. 7 is a side partial cross-sectional view of the flexible coupling used to form the expansion installation of the invention.

The improved pipe coupling of the invention is designated generally as 27 in FIG. 7. The coupling 27 could be used in any coaxially aligned piping system where the lengths encounter an angular fitting such as the elbow 15 (FIG. 2). The coupling 27 is particularly advantageous in countering the harmful effects of coaxial stresses which are often encountered in a "high temperature" insulated piping system, however. The term "high temperature" is intended to encompass any temperature above ambient which would tend to cause the type of damage to the surrounding insulating layers of the piping system discussed with respect to FIGS. 1–3 above. Typically, such temperatures will be above about 200° F., often above 250° F., and in some cases temperatures of 400° and higher will be encountered.

The flexible coupling 27 of the invention includes a first length 31 and a second length 33 (both shown broken away in FIG. 7) of insulated and jacketed pipe. Each of the lengths 31, 33 has a joining end 35 to be joined to a similar end 37 of the other length. Each pipe length comprises an inner pipe 39, 41, an envelope of foamed insulation 43, 45 surrounding the inner pipe and an outer protective jacket 47, 49 surrounding the envelope of insulation. The first and second pipe lengths 31, 33 can be standard factory type product of the kind described above and available from Thermacor Process, LP of Fort Worth, Tex.

As shown in FIG. 7, each inner pipe 39, 41 projects beyond the end of the envelope of insulation and beyond an end of the jacket to form initially exposed joining ends 35, 37. The joining ends 35, 37 of steel pipe will typically be welded together (illustrated by the vertical line in FIG. 7) in order to form a continuous fluid conduit for conveying high temperature fluids.

In the particular embodiment of the invention illustrated in FIG. 7, the surrounding foam insulation layers 43, 45 are typically polyurethane closed cell foam insulation for systems of up to about 250° F. and polyisocyanurate foam insulation for systems above 250° F. The surrounding jacket 47, 49 is a polyolefin, preferably HDPE.

Figure 8:
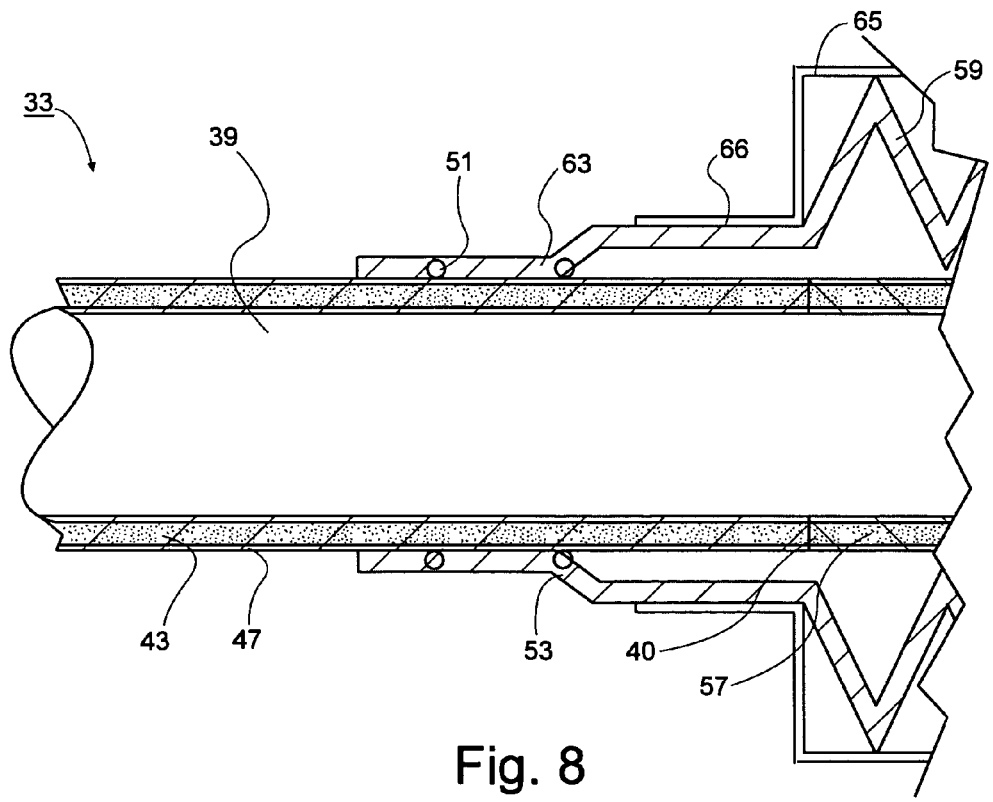
FIG. 8 is a close-up view of a portion of the flexible coupling of FIG. 7.

As shown in FIGS. 7 and 8, a layer of high temperature insulation 57 preferably surrounds the joining ends 35, 37 of the inner pipes 39, 41 and extends between the outer points 40, 42, respectively. The layer 57 can comprise a polyurethane foam for systems under 250° F. or a polyisocyanate foam for systems above 250° F. In some cases, it is possible to place a hollow jacket about the pipe joining ends 35, 37 with a two part commercially available mix being added through a hole in the jacket and allowed to cure. However, in the preferred method of forming the piping installation of the invention, the insulating layer for the joining ends of the pipe is preformed at the factory and provided as two side half cuts which are placed about the pipe joining ends to form a concentric cylinder. Each half cut is formed from a "crushable" foam so that the foam will be crushed or broken up upon relative movement of the inner pipes 39, 41. Note also that the crushable foam layer 57 is not joined to the exposed joining ends of the inner pipes or to the protective jackets, allowing its movement relative to these other components of the piping installation.

Figure 4:
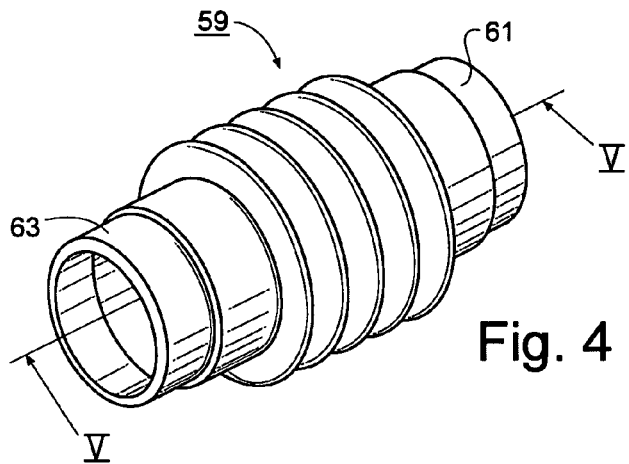
FIG. 4 is an isolated view of the bellows used in forming the flexible coupling of the invention.
Figure 5:
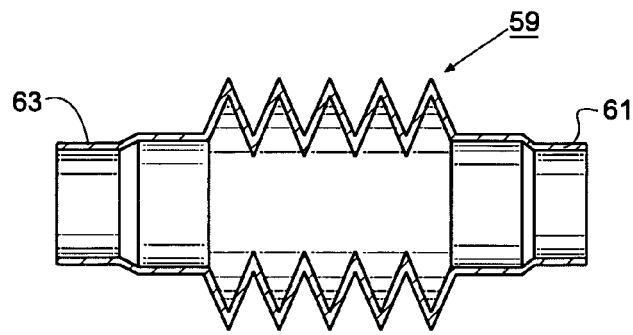
FIG. 5 is a side, cross-sectional view of the bellows taken along line V—V in FIG. 4.

A tubular bellows 59 (FIGS. 4 and 5) which can also be formed of HDPE surrounds the joining ends of the inner pipes. The bellows is capable of axially expanded and contracted and of being configured in a straight or axial configuration. The tubular bellows has opposing outer extents 61, 63 (FIGS. 7 and 8) which are joined to the prospective protective jackets of the respective pipe lengths being coupled. For example, the outer extent 63 is joined to the jacket 47 of the pipe end 33 in FIG. 8. This can be accomplished in a number of ways. For example, a commercially available POWERCORE welding wire (illustrated in simplified fashion as 51, 53 in FIG. 8) can be used to join the opposite extents of the tubular bellows 59 and the outer exposed surface of the HDPE jacket. The outer extent 63 of the bellows surrounds the jacket 47 and resistive wires 51, 53. Upon applying an electric current to the wires, a weld between the bellows and jacket is achieved. The entire bellows assembly can be covered with a protective shield, if desired. The shield (65 in FIG. 7) could be formed of lightweight metal or from a suitable thermoplastic. In the preferred embodiment illustrated in FIGS. 7 and 8, a poly ethylene shield 65 has flanges 66 which are received upon the outer extents of the bellows. If desired, a suitable resistive wire arrangement can be used to simultaneously electrofuse the bellows and shield, since both the bellows and shield can be formed of a HDPE type material.

Figure 6:
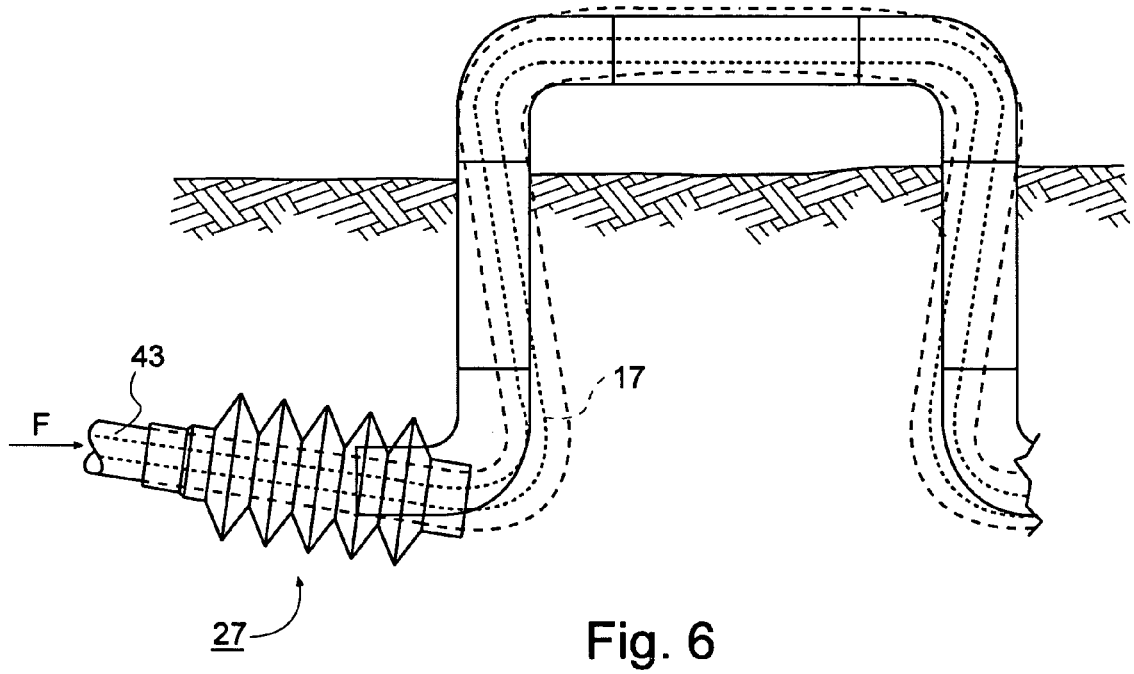
FIG. 6 is a simplified view of the flexible coupling of the invention showing its relative movement during expansion and contraction of the pipeline.

FIG. 6 illustrates the insulated piping installation of the invention with the flexible coupling 27 in place. In FIG. 6, the protective sleeve or shield 65 is not shown in order to better illustrate the action of the bellows 59. The force F, tends to cause the inner steel pipe 17 to assume the path illustrated by the dotted lines in FIG. 6. Because the bellows 59 can expand and contract, however, outer jacket remains intact and the integrity of the foam insulations (43 in FIGS. 6 and 7) is not disrupted. Because the insulating layer 43 remains intact, water or other contaminants are prevented from reaching the inner steel pipe 17, thereby extending the useful life of the pipeline.

An invention has been provided with several advantages. The flexible coupling of the invention alleviates problems previously encountered with high temperature piping systems where elbows and other angled fittings were subjected to damaging stresses. The system incorporates several existing, commercially available materials or components, thereby simplifying manufacture and assembly. The particular bellows and additional flexible coupling components of the system compensate for relative movement of the inner steel pipe which could disrupt the continuity of the surrounding insulating layer at an elbow or other fitting. The coupling is simple in design and economical to implement in a variety of industrial applications.

While the invention has been shown in one of its forms, it is not thus limited but is susceptible to various changes and modifications without departing from the spirit thereof.

What is claimed is:

1. A flexible, extendible and contractible pipe coupling for high temperature insulated piping, the coupling comprising:
   a first and second length of insulated and jacketed pipe, each having a joining end to be joined to an end of the other length, each pipe length comprising an inner pipe, an envelope of foamed insulation surrounding the inner pipe and an outer protective jacket surrounding the envelope of insulation;
   wherein each inner pipe projects beyond the end of the envelope of insulation and beyond an end of the jacket to form an exposed, joining end, the joining ends of the inner pipes being sealingly connected to form a continuous fluid conduit for conveying high temperature fluids;
   a flexible tubular bellows surrounding the joining ends of the inner pipes, the bellows being capable of being axially expanded and contracted and of being configured in a straight or curved axial configuration, the tubular bellows having opposing outer extents which are joined to the respective protective jackets of the respective pipe lengths being coupled thereby defining a closed bellows interior; and
   a layer of high temperature insulation surrounding the joining ends of the inner pipes within the closed bellows interior.

2. The pipe coupling of claim 1, wherein the foam insulation is selected from the group consisting of polyurethane foams and polyisocyanurate foam.

3. The pipe coupling of claim 1, wherein the protective jackets are formed from a synthetic polyolefin.

4. The pipe coupling of claim 1, wherein the tubular bellows is, in turn, surrounded by an expansion sleeve shield.

5. The pipe coupling of claim 1, wherein the tubular bellows is electrofused at either of the opposite extents thereof to the respective protective jackets of the respective pipe lengths being joined.

6. The pipe coupling of claim 1, wherein at least one of the lengths of insulated piping being joined is oriented at an angle with respect to the other length of insulated piping being joined by the coupling.

7. The pipe coupling of claim 1, wherein the respective lengths of insulated piping being coupled form an elbow.

8. The pipe coupling of claim 1, wherein the lengths of insulated piping being joined are part of a pipeline conveying steam, hot water or other hot fluids at a temperature in the range of above about 200° F.

9. The pipe coupling of claim 1, wherein the layer of high temperature insulation surrounding the joining ends of the inner pipes within an interior of the tubular bellows is a layer of insulating material selected from the group consisting of polyurethane foam and polyisocyanurate foam which is not joined to the exposed joining ends of the inner pipes or to the protective jackets.

10. A method of coupling lengths of insulated piping used to form a high temperature fluid conveyance system, the method comprising the steps of:
    providing a first and second length of insulated and jacketed pipe, each having a joining end to be joined to an end of the other length, each of the first and second lengths of pipe comprising an inner pipe, an envelope of foamed insulation surrounding the inner pipe and an outer protective jacket surrounding the envelope of insulation;
    forming each pipe length so that each inner pipe projects beyond the end of the envelope of insulation and beyond an end of the jacket to form an exposed, joining end;
    welding the joining ends of the inner pipes to thereby form a continuous fluid conduit for conveying high temperature fluids;
    providing a layer of high temperature insulation surrounding the joining ends of the inner pipes which is not joined to the exposed joining ends of the inner pipes or to the protective jackets; and
    surrounding the joining ends with a flexible tubular bellows, the bellows being capable of being axially expanded and contracted and of being configured in a straight or curved axial configuration, the tubular bellows having opposing outer extents which are joined to the respective protective jackets of the respective pipe lengths.

11. The method of claim 10, wherein the foam insulation which is used to surround the inner pipes is selected from the group consisting of polyurethane foam and polyisocyanurate foam.

12. The method of claim 10, wherein the protective jackets are formed of HDPE.

13. The method of claim 10, wherein the tubular bellows is, in turn, surrounded by an expansion sleeve shield.

14. The method of claim 10, wherein the tubular bellows is electrofused at either of the opposite extents thereof to the respective protective jackets of the respective pipe lengths.

15. The method of claim 10, wherein at least one of the lengths of insulated piping being joined is oriented at an angle with respect to the other length of insulated piping being joined by the coupling.

16. The method of claim 15, wherein the respective lengths of insulated piping being coupled form an elbow.

17. The method of claim 10, wherein the lengths of insulated piping being joined are part of a pipeline conveying steam at a temperature of 400 degrees F. or greater.

* * * * *